T. A. MATHEWSON.
Tap for Casks.
No. 159,522. Patented Feb. 9, 1875.
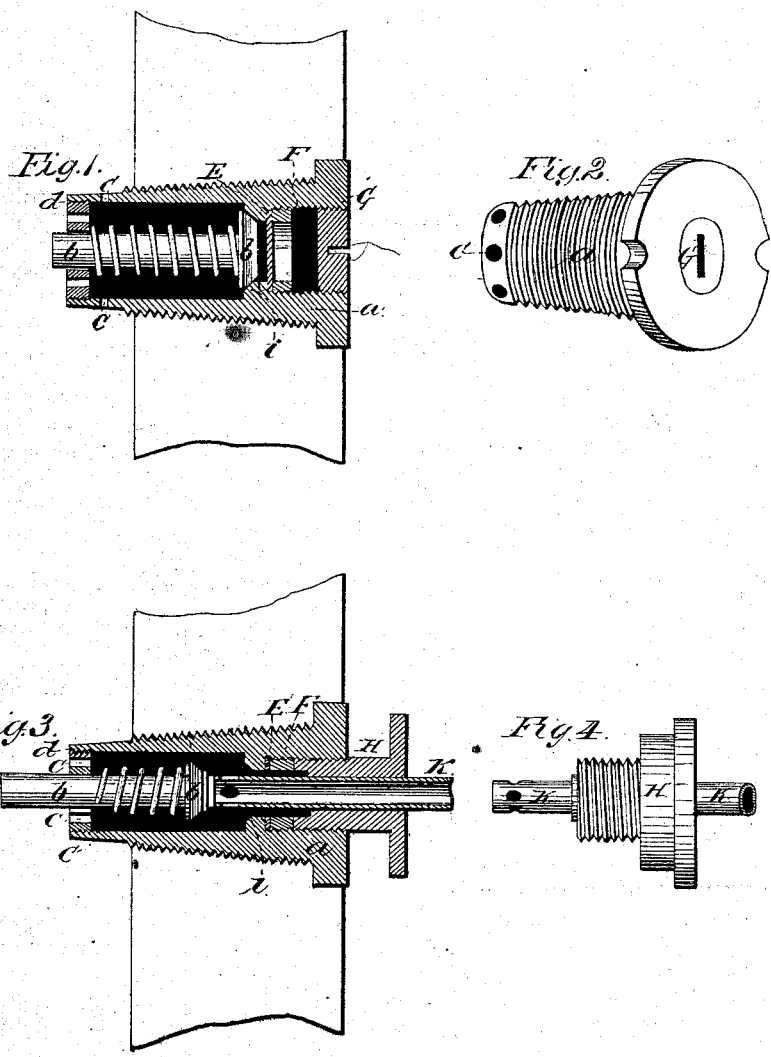

UNITED STATES PATENT OFFICE.

THOMAS A. MATHEWSON, OF PAWTUCKET, RHODE ISLAND.

IMPROVEMENT IN TAPS FOR CASKS.

Specification forming part of Letters Patent No. 159,522, dated February 9, 1875; application filed December 15, 1874.

*To all whom it may concern:*

Be it known that I, THOMAS A. MATHEWSON, of the town of Pawtucket, county of Providence, State of Rhode Island, have invented a new and useful Improvement in Taps for Casks; and I do hereby declare the following to be a full, clear, and exact description of the same, which will enable others skilled in the art to make and use the same, reference being had to the accompanying drawings forming part of this specification.

Figure I is a section of my improved tap for casks, showing the same sealed and closed for transportation. Fig. II is a perspective view of the same. Fig. III is a section showing the tap screwed into the bush, thus punching the seal and allowing the contents to be drawn off through the tap. Fig. IV is a view of the tap.

Similar letters of reference indicate corresponding parts.

The object of the invention is to arrange a bush for a barrel or cask which shall be a permanent fixture on the same, which can be made tight with a metallic stamped seal, in which the seal is protected from injury in handling, and which cannot be opened without punching or injuring the seal. Another object of the invention is to arrange a valve within the bush, which can be opened by the screwing in of the tap, and will close when the tap is removed.

The nature of the invention consists in the peculiar arrangement of the bush in connection with the seal and tap, as hereinafter described.

In the drawings, A is a bush secured to the barrel or cask by being screwed into the same. The interior of this bush has a projecting rim, i, one side of which forms the seat for the valve b, and the other a shoulder for receiving the soft-metal seal E, on which any desired device may be formed, so as to answer for a proprietary or revenue seal. F is the ring-follower, screwed down onto the metal seal so as to make a tight joint. G is a plug for closing the bush to prevent dirt from getting into the same. The valve b is held to its seat by a spiral spring resting against the disk d. This end of the bush is perforated with holes C C to allow the liquid to enter the same.

When the barrel is to be tapped the plug G is removed, and the tap H, having the pipe K resting by a shoulder against the tap H, is screwed into the bush A. The pipe K, forming a punch, is forced through the metal seal E, punching out the central portion of the same, now forces the valve b from its seat. The end of the pipe K being perforated, the liquid will flow into the pipe, and may thus be drawn from the barrel. A valve may be placed in the tap H, and thus the flow controlled without the use of the valve b. When the tap H is removed the valve b will again close, and on screwing in the plug G the barrel may be reshipped without leakage.

In most cases the valve b may be dispensed with, the soft-metal disk, firmly secured by the ring-follower, making a tight joint, which is easily broken by screwing in the tap H and pipe K, and the contents may then be drawn off without loss. When the disk E is once screwed down by the ring-follower, the same forms a tight seal, which cannot be removed without injury, and when punched by the pipe K the ring left is evidence that the same has been properly sealed.

This arrangement, therefore, forms a cheap bushing to prevent injury to the barrel by frequent tapping, a simple and efficient tight joint, a seal that cannot be tampered with or injured in handling, and, with the valve b, a complete faucet.

Having thus described my invention, I claim as new and desire to secure by Letters Patent—

1. The combination of the bush A, the soft-metal disk E, the shoulder i, and ring-follower F, substantially as and for the purpose herein described.

2. The combination, in a tap, of the bush A and valve b, the tap H, and pipe K, the latter operating as a detached valve-stem for opening and closing the valve, substantially as and for the purpose described.

3. The soft-metal disk E, secured within the bush A by the ring-follower F, having figures, characters, or devices on the same, and used as a seal, substantially as and for the purpose set forth.

THOMAS A. MATHEWSON.

Witnesses:
JAMES C. RICHARDSON,
JOSEPH A. MILLER.